US009342182B2

(12) United States Patent
Hermes

(10) Patent No.: US 9,342,182 B2
(45) Date of Patent: *May 17, 2016

(54) DETECTING PRESENCE OF AN OBJECT IN THE VICINITY OF A TOUCH INTERFACE OF A DEVICE

(71) Applicant: Atmel Corporation, San Jose, CA (US)

(72) Inventor: Bernard J. Hermes, Southampton (GB)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/268,693

(22) Filed: May 2, 2014

(65) Prior Publication Data

US 2014/0240285 A1 Aug. 28, 2014

Related U.S. Application Data

(63) Continuation of application No. 13/849,253, filed on Mar. 22, 2013, now Pat. No. 8,717,325.

(60) Provisional application No. 61/766,109, filed on Feb. 18, 2013.

(51) Int. Cl.
*G06F 3/045* (2006.01)
*G06F 3/041* (2006.01)
*G06F 3/044* (2006.01)

(52) U.S. Cl.
CPC .............. *G06F 3/0416* (2013.01); *G06F 3/044* (2013.01); *G06F 2203/04101* (2013.01)

(58) Field of Classification Search
CPC .......... G06F 3/041; G06F 3/044; G06F 3/047
USPC .................... 345/156–179; 178/18.01–18.06; 341/22, 23
See application file for complete search history.

(56) References Cited

U.S. PATENT DOCUMENTS

| 4,290,052 | A | 9/1981 | Eichelberger et al. |
| 5,805,251 | A | 9/1998 | Ozawa |
| 6,188,391 | B1 | 2/2001 | Seely et al. |
| 6,239,788 | B1 | 5/2001 | Nohno et al. |
| 7,463,238 | B2 * | 12/2008 | Funkhouser et al. . G06F 1/1601 345/107 |
| 7,663,607 | B2 | 2/2010 | Hotelling |
| 7,864,503 | B2 | 1/2011 | Chang |
| 7,875,814 | B2 | 1/2011 | Chen |

(Continued)

FOREIGN PATENT DOCUMENTS

WO WO 2012/129247 9/2012

OTHER PUBLICATIONS

U.S. Appl. No. 61/454,936, filed Mar. 21, 2011, Myers.

(Continued)

*Primary Examiner* — Prabodh M Dharia
(74) *Attorney, Agent, or Firm* — Baker Botts L.L.P.

(57) ABSTRACT

A system includes a controller situated on a circuit board and a touch sensor coupled to the controller. The touch sensor includes a plurality of electrodes configured to capacitively coupled to a surface. The system also includes a drive element that is coupled to the controller. The controller is configured to send a drive signal to the drive element and, after sending the drive signal to the drive element, receive a set of sense signals from the touch sensor. The controller is further configured to determine whether an object that is not contact with the surface is in a vicinity of the surface the set of sense signals.

20 Claims, 5 Drawing Sheets

(56) References Cited

U.S. PATENT DOCUMENTS

| | | |
|---|---|---|
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,089,470 B1 | 1/2012 | Schediwy et al. |
| 8,179,381 B2 | 5/2012 | Frey |
| 8,217,902 B2 | 7/2012 | Chang et al. |
| 8,283,567 B2 | 10/2012 | Yoo et al. |
| 8,723,824 B2 | 5/2014 | Myers et al. |
| 2006/0050059 A1 | 3/2006 | Satoh et al. |
| 2008/0088594 A1 | 4/2008 | Liu et al. |
| 2008/0088595 A1 | 4/2008 | Liu et al. |
| 2008/0179112 A1 | 7/2008 | Qin et al. |
| 2008/0309635 A1 | 12/2008 | Matsuo |
| 2009/0039740 A1* | 2/2009 | Sortore et al. ............... 310/68 B |
| 2009/0066669 A1* | 3/2009 | Olson ........................... 345/174 |
| 2009/0160529 A1 | 6/2009 | Lamborghini et al. |
| 2009/0315854 A1 | 12/2009 | Matsuo |
| 2010/0079401 A1 | 4/2010 | Staton |
| 2010/0079402 A1 | 4/2010 | Grunthaner et al. |
| 2010/0096193 A1 | 4/2010 | Yilmaz et al. |
| 2011/0080357 A1* | 4/2011 | Park et al. ............... G06F 3/044 345/173 |
| 2011/0080358 A1* | 4/2011 | Park et al. ............... G06F 3/044 345/173 |
| 2011/0147192 A1 | 6/2011 | Hsu |
| 2011/0157078 A1 | 6/2011 | Miyazawa et al. |
| 2011/0169783 A1* | 7/2011 | Wang et al. ........... G06F 3/0412 345/176 |
| 2011/0261007 A1 | 10/2011 | Joharapurkar et al. |
| 2011/0298745 A1 | 12/2011 | Souchkov |
| 2012/0019165 A1 | 1/2012 | Igaki et al. |
| 2012/0032917 A1 | 2/2012 | Yamaguchi |
| 2012/0050193 A1 | 3/2012 | Noguchi et al. |
| 2012/0057312 A1 | 3/2012 | Yoo et al. |
| 2012/0229417 A1 | 9/2012 | Badaye |
| 2012/0229882 A1* | 9/2012 | Fish, Jr. et al. .......... B60R 1/025 359/267 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |
| 2013/0314365 A1* | 11/2013 | Woolley et al. ................ 345/174 |
| 2013/0335370 A1 | 12/2013 | Heo et al. |
| 2014/0104233 A1* | 4/2014 | Wang et al. ........... G06F 3/0412 345/174 |
| 2014/0111443 A1* | 4/2014 | Guo et al. ...................... 345/173 |
| 2014/0176819 A1* | 6/2014 | Yilmaz ............................ 349/12 |

OTHER PUBLICATIONS

U.S. Appl. No. 61/454,950, filed Mar. 21, 2011, Lynch.
U.S. Appl. No. 61/454,894, filed Mar. 21, 2011, Rothkopf.

* cited by examiner

DETECTING PRESENCE OF AN OBJECT IN THE VICINITY OF A TOUCH INTERFACE OF A DEVICE

RELATED APPLICATIONS

This application is a continuation, under 35 U.S.C. §120, of U.S. patent application Ser. No. 13/849,253, filed Mar. 22, 2013 and entitled "Detecting Presence of an Object in the Vicinity of a Touch Interface of a Device," which claims the benefit, under 35 U.S.C. §119(e), of U.S. Provisional Patent Application Ser. No. 61/766,109, titled "DETECTING PRESENCE OF AN OBJECT IN THE VICINITY OF A TOUCH INTERFACE OF A DEVICE," filed on Feb. 18, 2013, which are incorporated herein by reference in their entirety.

TECHNICAL FIELD

This disclosure relates generally to touch screen devices and more particularly to detecting the presence of an object in the vicinity of a touch interface of a device.

BACKGROUND

A touch sensor may detect the presence and location of a touch on, or the presence of an object (such as a user's finger or a stylus) within a vicinity of, a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within a vicinity of the surface of the capacitive touch screen, a change in capacitance may occur within the touch screen at the location of the touch or vicinity. A touch-sensor controller may process the change in capacitance to determine its position on the touch screen.

DESCRIPTION OF EXAMPLE EMBODIMENTS

Figure 1:
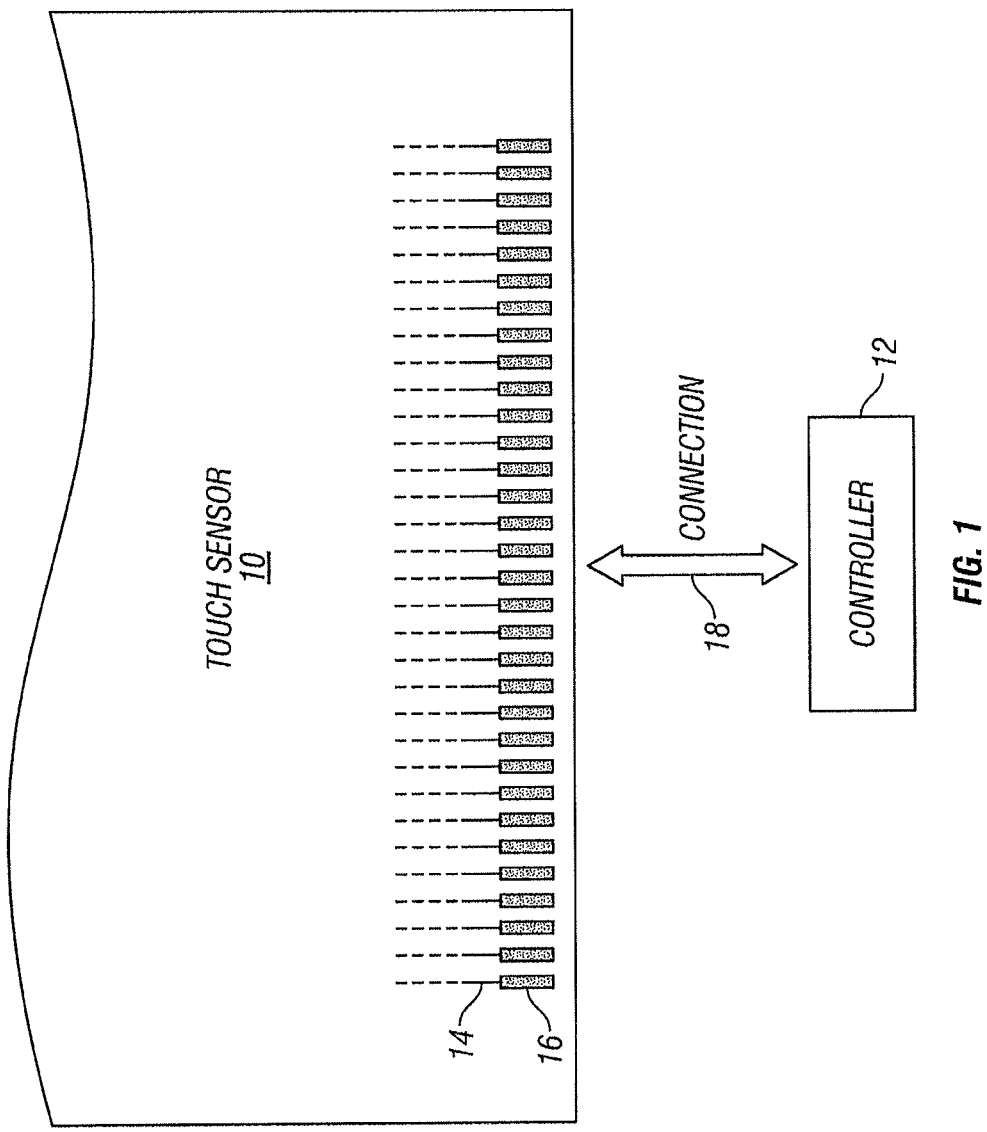
FIG. 1 is a schematic diagram that illustrates an example of a touch sensor and an example of a touch-sensor controller.

FIG. 1 is a schematic diagram that illustrates an example of touch sensor 10 and an example of touch-sensor controller 12. Touch sensor 10 and touch-sensor controller 12 may detect the presence and location of a touch of an object on, or the presence or location of an object in a vicinity of, a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of electrodes disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 μm or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

In some embodiments, touch sensor 10 may implement a form of touch sensing based on sensing signal reflections. Touch sensor 10 may include electrodes forming one or more lines. A signal (e.g. a pulse or a periodic signal) may be applied to a line of touch sensor 10 (e.g. by touch-sensor controller 12), and a reflection of the signal applied to the line may be caused by an external influence (such as a touch of an object or the presence of an object in a vicinity of touch sensor 10). When an object touches or comes within a vicinity of the line, a change in impedance may occur at or near a location of the line where the touch or the approach of the object occurred.

In particular embodiments, one or more electrodes may together form a line running horizontally or vertically or in any suitable orientation. In particular embodiments, one or more electrodes may run substantially perpendicular to other electrodes. A line may have a serpentine shape or may be configured as a space-filling curve. Herein, a line may encompass one or more electrodes making up the line, and vice versa, where appropriate.

Touch sensor 10 may have electrodes disposed in a pattern on one side of a single substrate. In addition or as an alternative, touch sensor 10 may have electrodes disposed in a pattern on another side of a substrate. Although this disclosure describes particular configurations of particular electrodes forming particular lines, this disclosure contemplates any suitable configuration of any suitable electrodes disposed on any suitable number of any suitable substrates in any suitable patterns.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the electrodes of touch sensor 10. The sense unit may sense signal reflections from the electrodes of touch sensor 10 and provide measurement signals to the processor unit representing signal reflections. The processor unit may control the supply of drive signals to the electrodes by the drive unit and process measurement signals from the sense unit to detect and process the presence and location of a touch input within the touch-sensitive area(s) of touch sensor 10 or input based on the presence of an object in a vicinity of touch sensor 10. The processor unit may also track changes in the position of a touch input within the touch-sensitive area(s) of touch sensor 10 or in the presence of an object in a vicinity of touch sensor 10. The storage unit may store programming for execution by the processor unit, including programming for controlling the drive unit to supply drive signals to electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide connections for coupling touch-sensor controller 12 to electrodes of touch sensor 10, through which the drive unit of touch-sensor controller 12 may supply drive signals to the electrodes. Tracks 14 may provide connections for coupling touch-sensor controller 12 to electrodes of touch sensor 10, through which the sense unit of touch-sensor controller 12 may sense signals from the electrodes of touch sensor 10. In some embodiments, one of tracks 14 may be configured such that it is used both to transmit drive signals from touch-sensor controller 12 to certain electrodes of touch sensor 10 and to transmit signals from electrodes of touch sensor 10 to the sense unit of touch-sensor controller 12. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between touch-sensor controller 12 and touch sensor 10. In some embodiments, touch sensor 10 may be configured to include pattern resistors, capacitors, or inductors (e.g. formed using FLM or other suitable material used in touch sensor 10) such that any of the interfaces (e.g. connection pads 16) between touch-sensor controller 12 and touch sensor 10 are impedance matched. For example, the pattern resistors, capacitors, or inductors may be configured to simulate Bayonet Neill-Concelman (BNC) connectors (e.g. 50, 75, or 100 ohm connectors).

Particular embodiments may use one or more suitable components, elements, functions, operations, or steps illustrated by or described above with respect to FIG. 1 to implement one or more suitable components, elements, functions, operations, or steps illustrated by or described below with respect to FIGS. 2-5, where appropriate.

Figure 2:
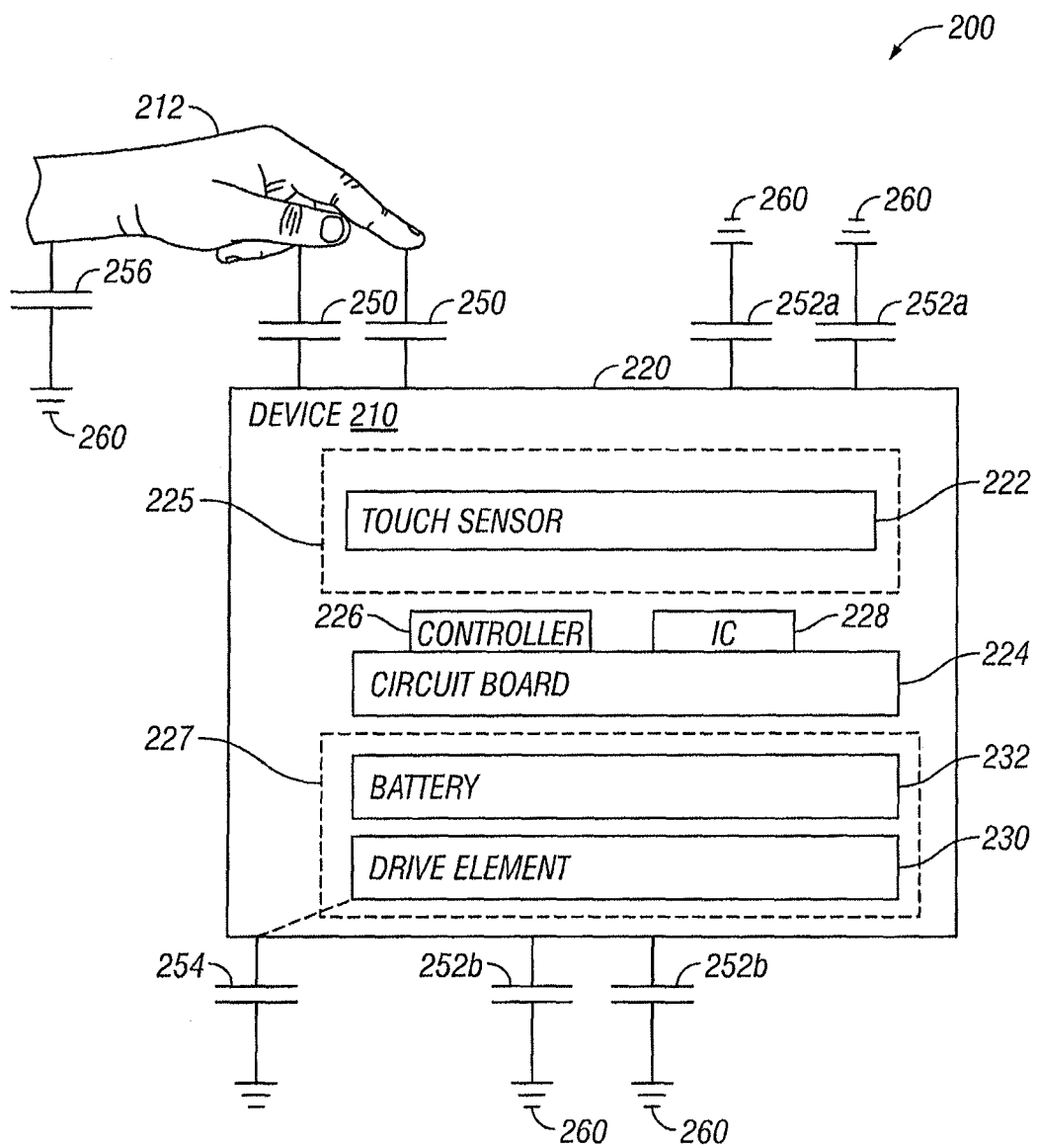
FIG. 2 is a schematic diagram that illustrates an example of detecting the presence of an object in a vicinity of a device.

FIG. 2 is a schematic diagram that illustrates an example of detecting the presence of object 212 in a vicinity of device 210. Device 210 includes surface 220 and touch sensor 222 arranged behind surface 220. Device 210 also includes circuit board 224. Controller 226 and one or more integrated circuits 228 are mounted on circuit board 224. Device 210 further includes drive element 230 and battery 232. In the illustrated example, region 225 (which includes touch sensor 222 in the depicted embodiment) is an area located on one side of circuit board 224 and region 227 (which includes drive element 230 in the depicted embodiment) is an area located on an opposite side of circuit board 224.

Capacitive relationships between various elements in system 200 are depicted using capacitances 250, 252a-b, 254, and 256. Capacitances 250 indicate a capacitive relationship between object 212 and device 210. Capacitance 252a indicates a capacitive relationship between one side of device 210 and free space ground 260, and capacitance 252b indicates a capacitive relationship between another side of device 210 and free space ground 260. Capacitance 256 illustrates a capacitive relationship between object 212 and free space ground 260. Capacitance 254 illustrates the capacitive relationship between drive element 230 and free space ground 260.

In operation, in some embodiments, controller 226 is configured to cause signals to be sent to drive element 230 and to send signals to, and receive signals from, touch sensor 222 as part of a self-capacitive measurement of touch sensor 222. Controller 226 is further configured to detect the presence of object 212 in a vicinity of device 210 using this measurement. Operating in this manner may, in various embodiments, reduce the impact of stray capacitances and/or parasitic capacitances associated with controller 226 on the accuracy of detecting whether object 212 is in a vicinity of device 210. For example, such stray capacitances may not affect, or may have a reduced effect on, measurements of touch sensor 222 because both drive element 230 and object 212 are capacitively coupled to free space ground 260. In some embodiments, because both drive element 230 and object 212 are capacitively coupled to free space ground 260, stray capacitances may become common to the measurements and thereby substantially negated.

In some embodiments, device 210 is configured to detect the presence of object 212 based, at least in part, on a capacitive relationship between device 210 and object 212. As examples, device 210 may be and/or include any suitable combination of: a mobile phone, a personal digital assistant, a media player, a tablet computing device, a laptop computer, a computer, a touch screen interface, a touch interface, a keypad, a keyboard, a trackpad, a mouse, a touch screen, a display, a camera, and any other suitable device. As examples, object 212 being in a vicinity of device 210 may include object 212: approaching device 210, hovering over device 210, moving over device 210 (e.g. performing a gesture over device 210), and contacting device 210. In certain embodiments, a vicinity of device 210 includes a portion or all of a distance within which object 212 may measurably affect capacitances of electrodes of touch sensor 222. For example, object 212 present above or approaching device 210 may be considered in a vicinity of device 210 at certain distances. In certain embodiments, object 212 may be in a vicinity of device 210 when it contacts device 210 or when it does not contact device 210.

FIG. 2 illustrates an embodiment where regions 225 and 227 within device 210 are defined with respect to sides of circuit board 224. In some embodiments, other suitable regions or areas may be defined within device 210, and in some embodiments device 210 may not include regions 225 and 227. Regions 225 and 227 may be physically demarcated within device 210 using suitable structures or may simply be conceptual and defined by reference to components of device 210.

Surface 220 may be implemented using any suitable materials. As examples, surface 220 may be implemented using one or more of glass, plastic, or metals. The choice of material of surface 220 may depend on the implementation of touch device 210 (e.g. whether touch device 210 is a smartphone, a display, or a trackpad).

In some embodiments, object 212 is an object that can have a capacitive relationship with device 210. As examples, object 212 may be one or more of the following: a stylus (active or passive), an aspect of a human body (e.g. one or more fingers, a palm, and/or a face), a glove (active or passive), interface peripherals (e.g. a keyboard, a keypad, a mouse, and a wand).

In some embodiments, touch sensor 222 may be implemented using one or more aspects of touch sensor 10 of FIG.

1. For example, touch sensor 222 may include electrodes arranged in a two-dimensional space. Touch sensor 222 may include sense electrodes and/or drive electrodes. Such electrodes may be arranged behind surface 220. In certain embodiments, touch sensor 222 being arranged behind surface 220 refers to touch sensor 222 being within device 210 and that surface 220 is situated between touch sensor 222 and an area outside of device 210.

In some embodiments, circuit board 224 is an object that mechanically supports, and facilitates communication between, electronic components of device 210. For example, circuit board 224 may be a printed circuit board. Circuit board 224 may facilitate the communication of signals between touch sensor 222 and controller 226 and the communication of signals between controller 226 and integrated circuits 228. In some embodiments, integrated circuits 228 comprise one or more electronic components including, but not limited to, digital circuits and analog components (e.g. resistors, capacitors, and inductors). Device 210 may facilitate the communication of signals between controller 226 and touch sensor 222 without circuit board 224 (e.g. using leads, wires, or other suitable conductors).

In some embodiments, drive element 230 is a structure capable of receiving one or more signals from controller 226. Drive element 230 may be implemented using any suitable shape or material. As examples, drive element 230 may be implemented using one or more of: metallic foil (e.g. aluminum or copper foil), conductive material, a coil, wires, leads, metallic plates, or other suitable conductors. In some embodiments, drive element 230 may be implemented using one or more of the techniques discussed above with respect to electrodes of touch sensor 10 of FIG. 1 (e.g. using ITO or FLM). Drive element 230 may be implemented using any suitable shape, such as a bar, a plate, a rod, or a sheet. In certain embodiments, drive element 230 may be placed in device 210 such that it does not unduly interfere with the performance of antennas in device 210 (e.g. when device 210 is a mobile phone or is equipped with wireless communication such as functionality specified in standards promulgated by the IEEE 802.11 working group or the standards promulgated by the Bluetooth Standards Interest Group). For example, drive element 230 may be placed near battery 232 and in such a manner that it does not shield electromagnetic signals being received or transmitted by antennas of device 210. In some embodiments, device 210 does not include battery 232; placement of drive element 230 in such embodiments may be performed by considering the location of antennas in device 210. As another example, drive element 230 may be placed by considering the magnitude of its capacitive coupling to free space. In some embodiments, this may be done by placing drive element 230 such that the magnitude of its capacitive coupling to free space is substantially the same as the magnitude of the capacitive coupling of touch sensor 222 to free space.

In some embodiments, controller 226 may be implemented using one or more aspects of controller 12 of FIG. 1. Controller 226 may be configured to send and receive signals from touch sensor 222 and drive element 230. Controller 226 may be configured to process received signals and detect whether object 212 is present in a vicinity of device 210. As examples, controller 226 may use self-capacitance measurements, mutual capacitance measurements, or a suitable combination of both self-capacitance and mutual capacitance measurements. Controller 226 may include an electrical ground (e.g. a ground plane or a ground pin) that is different than free space ground 260. The ground plane may be local to controller 226 and to other components electrically coupled to controller 226.

In some embodiments, controller 226 may be configured to use self-capacitance measurements to detect whether object 212 is in a vicinity of device 210. For example, controller 226 may be configured to analyze capacitances 250 related to the presence of object 212. In some embodiments, capacitances 250 may be in the range of, e.g., 5-15 attofarads while the stray capacitance to a ground plane of controller 226 may be in the range of, e.g., 70-130 picofarads; this may make methods of analyzing capacitances 250 that use charge removal techniques susceptible to noise. Other suitable ranges for these capacitances may be present in various embodiments. One advantage of certain embodiments of system 200 is that certain effects of stray capacitances (e.g. capacitances of components of system 200 to free space ground 260 such as capacitances 252a-b) may be substantially reduced or negated by not coupling drive element 230 to the ground plane of controller 226. This may lead to a reduced use of charge removal techniques and less susceptibility to noise.

In some embodiments, the sum of the free space capacitances 252a-b may be in the range of, e.g., 5-8 picofarads. Conceptually, this may be viewed as illustrated in FIG. 2 where capacitances 252a and 252b may each total to, e.g., 4 picofarads. Other suitable ranges for these capacitances may be present in various embodiments. Having touch sensor 222 near capacitances 252a and drive element 230 near capacitances 252b may be advantageous. Such advantages may be realized, in some embodiments, by having controller 226 perform self-capacitive measurements by sending signals to drive element 230, receiving and analyzing signals from touch sensor 222, and determining characteristics related to capacitances 250.

For example, as object 212 enters a vicinity of device 210, capacitive coupling between object 212 and device 210 is increased and more charge is transferred through touch sensor 222 as a result of controller 226 driving drive element 230. Changes in the amount of charge transferred through touch sensor 222 may be used to detect presence of object 212 in a vicinity of device 210 and/or movement of object 212 towards or away from device 210.

As an example, in determining whether object 212 is present in a vicinity of device 210, controller 226 may be configured to combine the measurements of a plurality of electrodes of touch sensor 222 and analyze the total magnitude of the received signals. Such calculations may be used to determine whether object 212 is approaching or receding from device 210. These calculations may be used to determine capacitance 250. This determined value of capacitance 250 may be compared to a stored value of capacitance 252a. In this example, the stored value of capacitance 252a was measured at a time when it was known that object 212 is not in a vicinity of device 210. A suitable difference between the determined value of capacitance 250 and the stored value of capacitance 252a may lead to a determination by controller 226 that object 212 is in a vicinity of device 210. In some embodiments, the presence of object 212 in a vicinity of device 210 may be detected at distances, e.g., up to approximately 10 centimeters or more away from surface 220. Other suitable ranges may be present in various embodiments.

In some embodiments, controller 226 may be configured to detect a position on touch sensor 222 above which object 212 is located. For example, controller 226 may determine coordinates (e.g. x-y coordinates) associated with a position on touch sensor 222 above which object 212 is hovering but not in contact with surface 220. In some embodiments, such a position of object 212 relative to sensor 222 may be determined when object 212 is at a distance, e.g., up to approximately 2 centimeters or more from surface 220. Other suitable ranges may be present in various embodiments. As another example, controller 226 may determine three-dimensional coordinates (e.g. x-y-z coordinates) related to the position of object 212 (i.e., the distance between object 212 and device 210 as well as the projection of the position of object 212 onto the plane of touch sensor 222). For example, controller 226 may be configured to combine the measurements of a plurality of electrodes of touch sensor 222 and analyze the total magnitude of the received signals. These calculations may be used to determine capacitance 250. This determined value of capacitance 250 may be compared to a stored value of capacitance 252a. In this example, the stored value was measured at a time when it was known that object 212 is not in a vicinity of device 210. Further, in this example, the distance between object 212 and the magnitude of capacitance 252a may be inversely proportional. This relationship, the stored value of capacitance 252a, and the determined value of capacitance 250 may be used to approximate the distance between object 252 and device 210 to a desired degree of certainty. In some embodiments, a distance between object 212 and device 210 may be determined when object 212 is at a distance up to approximately 10 centimeters or more from surface 220. Other suitable ranges may be present in various embodiments.

In some embodiments, controller 226 may be configured to detect positions on touch sensor 222 above which multiple objects 212 are located. Coordinates (e.g. x-y coordinates or x-y-z coordinates) associated with each object 212 may be determined in a manner similar to that described above. Controller 226 may also be configured to analyze the determined coordinates over time to determine motion of the object(s) 212 performed in a vicinity of device 210. For example, this analysis may be implemented by tracking determined coordinates using suitable algorithms such as a ballistics algorithm. Determined coordinates may be tagged and tracked over time. In this manner, continuous movement of object(s) 212 may be recognized and reported as continuous movement rather than a series of object(s) 212 detected in the vicinity of device 210 over time.

As examples, analyzing such motion may lead to the detection of gestures performed by objects 212 in a vicinity of device 210 such as swiping gestures (e.g. moving one finger in a horizontal, vertical, or diagonal direction), pinching gestures (e.g. bringing two fingers towards each other), spreading gestures (e.g. moving two fingers away from each other), and rotating or spinning gestures (e.g. having two fingers move along a curved path in three-dimensional space). Various methods may be employed to detect such movement. As one example, if two objects 212 are moving above device 210, the two objects 212 may affect two lines of electrodes on an x-axis of touch sensor 222 and two lines of electrodes on a y-axis of touch sensor 222. Controller 226 may be configured to compute four coordinate pairs corresponding to the four intersection points of the affected lines of electrodes using self-capacitive measurements. The area enclosed by the four coordinate pairs may be monitored to detect motion. Thus, in this example, if the area is growing larger, controller 226 may determine that a spreading gesture is being performed; if the area is growing smaller, controller 226 may determine that a pinching gesture is being performed.

In some embodiments, controller 226 may be configured to determine certain characteristics of movement of object 212 without needing to determine coordinates of object 212. For example, controller 226 may be configured to conceptually divide touch sensor 222 into quadrants. Controller 226 may combine the signals received from electrodes in each of the quadrants and determine whether object 212 is in a particular quadrant by comparing the signal magnitudes associated with each quadrant and identifying the quadrant that has the largest signal magnitude. While the preceding description assumed that touch sensor 222 would be conceptually divided into quadrants, other suitable divisions may be used. Determining such gestures without calculating coordinate positions may be useful in certain applications. For example, device 210 may be an electronic book and a user may perform a gesture in the air (without contacting device 210) by moving their finger from right to left indicating a desire to have the page turned; gesture detection based on conceptually aggregating electrodes of touch sensor 222 into quadrants may provide such functionality by detecting motion starting on a right quadrant and ending on a left quadrant. As another example, a user may move his or her finger in a sweeping motion in the air starting from the bottom of device 210 to the top of device 210 indicating a desire to scroll the text of device 210 so that more data may be viewed. Gesture detection based on conceptually aggregating electrodes of touch sensor 222 into quadrants may provide such functionality by detecting motion starting on a lower quadrant and ending on an upper quadrant.

In some embodiments, the gestures detected above may be determined when object 212 is at a distance, e.g., up to approximately 2.5 centimeters or more from device 210. The example distances identified herein are provided for example purposes only and other suitable ranges for these distances may be present in various embodiments.

In some embodiments, controller 226 may be configured to perform multiple measurements within a particular time period (e.g. a period of 5-15 milliseconds). A self-capacitive measurement may be taken by driving drive element 230 (e.g. to determine whether object 212 is in physical contact with device 210). Then, a measurement of touch sensor 222 may be taken without any drive signal being applied to drive element 230 or to touch sensor 222 (e.g. to determine noise levels). Afterwards, a mutual capacitive measurement may be taken (e.g. by driving certain electrodes of touch sensor 222 and receiving resulting signals from other electrodes of touch sensor 222). This may be performed to detect position of one or more points of physical contact between object 212 and device 210, and, in some embodiments, determining coordinates for the detected positions. A second self-capacitive measurement may be taken by sending a signal to drive element 230. For example, this may be performed to detect whether object 212 is in a vicinity of device 210 but not in physical contact with device 210. In some embodiments, the second self-capacitive measurement may not be performed if the mutual capacitive measurement detects that object 212 is in physical contact with device 210.

Controller 226 may apply various levels of gain to the measurements received from touch sensor 222 discussed above suitable for the purpose of each measurement. For example, the gain applied in the first self-capacitive measurement may be different than the gain applied in the second self-capacitive measurement. As another example, the gain applied in the second self-capacitive measurement may be different than the gain applied in the mutual capacitive measurement. Various factors may determine when and how gain is applied, such as the dynamic range of signals received from touch sensor 222, margins related to noise levels, and the available set of gains. For example, in certain embodiments capacitance 250 may increase as a function of the inverse square of the distance between object 212 and device 210. It may be appropriate to increase gain as object 212 recedes from device 210 and to decrease gain as object 212 approaches device 210. In some embodiments, upper and lower limits may be established concerning various measurements and calculations performed by controller 226 (e.g. signals received from touch sensor 222 and determinations of the magnitude of capacitances in system 200 such as capacitance 250). Various gains may be used to cause such measurements and calculations to be within the upper and lower limits.

Figure 3:
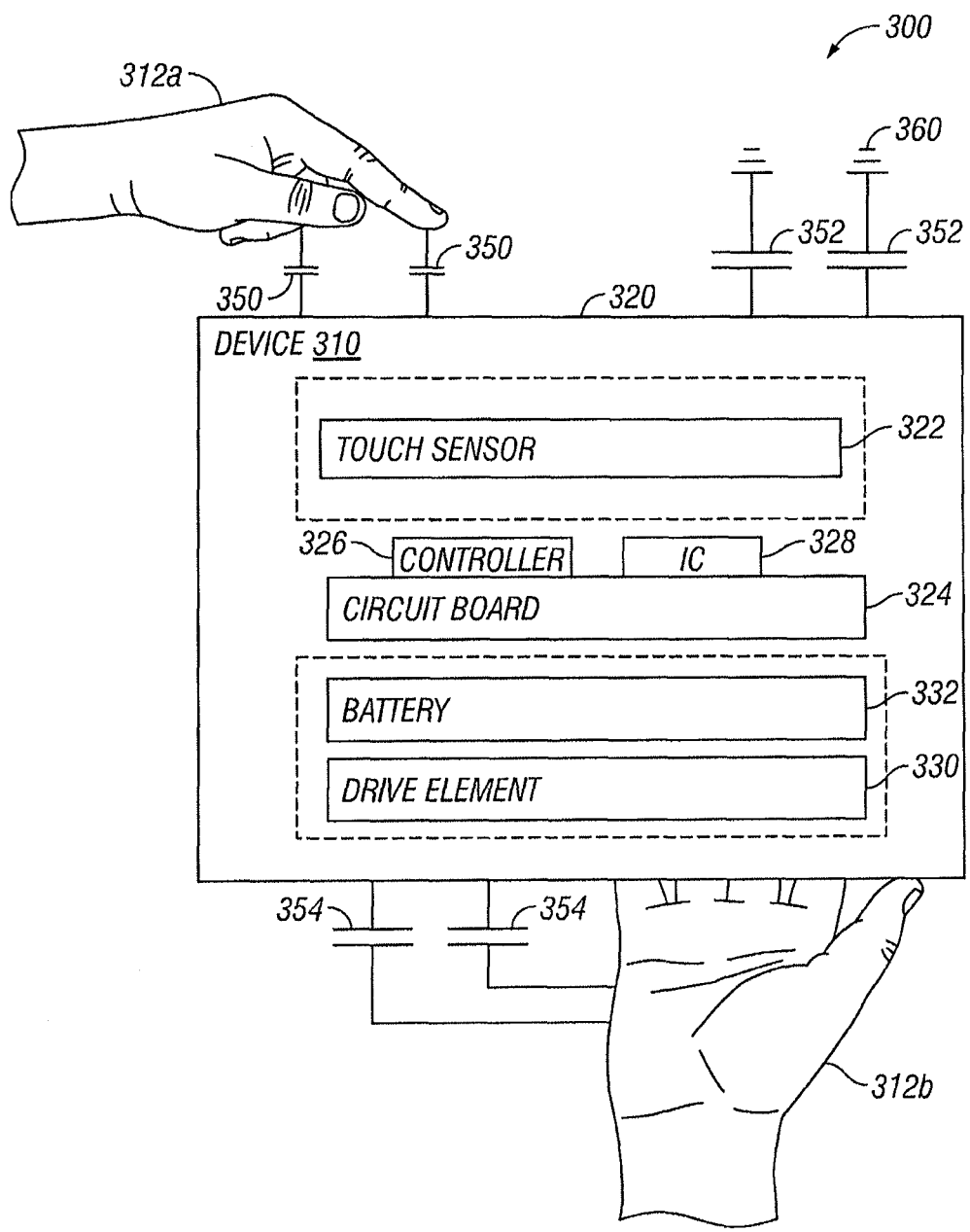
FIG. 3 is a schematic diagram that illustrates an example of detecting the presence of an object in a vicinity of a touch sensor of a device when the device is being held by another part of the same object.

FIG. 3 is a schematic diagram that illustrates an example of detecting the presence of object 312a in a vicinity of touch sensor 322 of device 310 when device 310 is being held by another object 312b. Object 312a and object 312b may be part of the same structure. Device 310 includes surface 320 and touch sensor 322. Device 310 also includes circuit board 324 on which controller 326 and one or more integrated circuits 328 are situated. Device 310 further includes drive element 330 and battery 332. In the illustrated example of FIG. 3, region 325 (which includes touch sensor 322 in the depicted embodiment) is an area located on one side of circuit board 324 and region 327 (which includes drive element 330 in the depicted embodiment) is an area located on an opposite side of circuit board 324. Capacitive relationships in system 300 are depicted using capacitances 350, 352, and 354. Capacitances 350 indicate a capacitive relationship between object 312a and device 310. Capacitances 352 indicate a capacitive relationship between device 310 and free space ground 360. Capacitances 354 illustrate a capacitive relationship between drive element 330 and object 312b.

In operation, in some embodiments, controller 326 is configured to cause signals to be sent to drive element 330 and to send signals to, and receive signals from, touch sensor 322. Controller 326, in some embodiments, is further configured to detect the presence of object 312a in a vicinity of device 310. In certain embodiments, coupling between drive element 330 and touch sensor 322 of FIG. 3 may be larger than the coupling between drive element 230 and touch sensor 222 of FIG. 2 because object 312b is in contact with device 310 and in a capacitive relationship with drive element 330. As an example, system 300 may represent a user holding device 310 in one hand (object 312b) while having the other hand (object 312a) in a vicinity of device 310.

In some embodiments, components of system 300 of FIG. 3 may be implemented in a manner similar to corresponding components of system 200 of FIG. 2. Device 310, touch sensor 322, controller 326, circuit board 324, integrated circuits 328, battery 332, and drive element 330 may be implemented using the techniques discussed above with respect to device 210, touch sensor 222, controller 226, circuit board 224, integrated circuits 228, battery 232, and drive element 230, respectively. Objects 312a and 312b may be implemented using the examples discussed above with respect to object 212. Controller 326 may be configured to perform one or more of the analyses discussed above with respect to controller 226 (e.g. detecting gestures performed by object 312a or one-, two-, or three-dimensional coordinates associated with object 312a).

FIG. 3 illustrates an embodiment where regions 325 and 327 within device 310 are defined with respect to sides of circuit board 324. In some embodiments, other suitable regions or areas may be defined in relation to other aspects of device 310 and may or may not include regions 325 and 327. Regions 325 and 327 may be physically demarcated within device 310 using suitable structures or may simply be conceptual and defined by reference to components of device 310.

Figure 4:
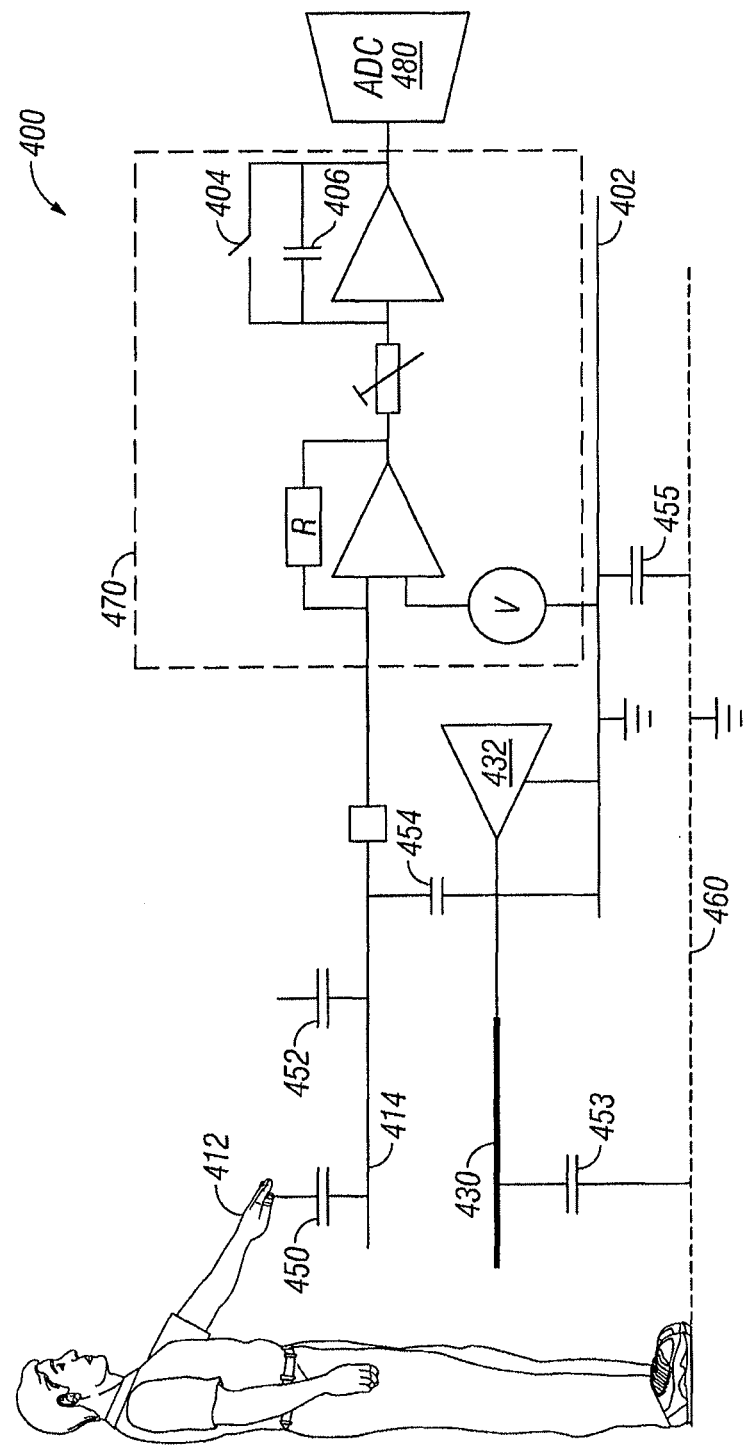
FIG. 4 is a schematic diagram that illustrates an example of a self-capacitive measurement operation for detecting the presence of an object in a vicinity of a device (e.g. device 210 in FIG. 2).

FIG. 4 is a schematic diagram that illustrates an example of a self-capacitive measurement operation for detecting the presence of object 412 in a vicinity of a device (e.g. device 210 in FIG. 2). Line 414 is a line of electrodes of a touch sensor (e.g. touch sensor 222) included in the device. The capacitive relationship between object 412 and line 414 is represented by capacitor 450. The capacitive relationship between line 414 and free space ground 460 is represented by capacitor 452. The capacitive relationship between drive element 430 and free space ground 460 is represented by capacitor 453. Drive element 430 (which may be implemented using any of the techniques described above with respect to drive element 230 of FIG. 2) is coupled to driver 432 (e.g. a component of controller 226). The capacitive relationship between line 414 and ground plane 402 (e.g. a ground plane internal to a controller such as controller 226 included in the device) is represented by capacitor 454. The capacitive relationship between ground plane 402 and free space ground 460 is represented by capacitor 455.

An example operation of system 400 follows. Switch 404 may be momentarily closed to discharge capacitor 406. In some embodiments, capacitor 406 may not be discharged. Driver 432 (which can be implemented using any suitable combination of hardware, software, and firmware) may send a signal to drive element 430. Although the drive signal may have any suitable value, according to particular needs, an example characteristic for the drive signal is that it has an amplitude of 3.3 volts. An effective voltage across capacitor 450, $V_{450}$, may be calculated as:

$$V_{450} = V_{drive} \times C_{453}/(C_{453}+C_{455})$$

$V_{drive}$ is the voltage of the drive signal sent by driver 432. $C_{455}$ is the capacitance of capacitor 455. The charge displaced from capacitors 450 and 452 may be scaled and integrated into capacitor 406 (used to measure the displaced charge) using subsystem 470. Analog-to-digital converter (ADC) 480 (which can be implemented using any suitable combination of hardware, software, and firmware) may be configured to measure the voltage across capacitor 406 and determine a value ($ADC_{value}$) over time as:

$$ADC_{value} = V_{450} \times (C_{450}+C_{452})$$

$C_{452}$ is the capacitance of capacitor 452. This value is recorded and used for further processing (e.g. detecting presence of object 412, movement of object 412, position of object 412 as discussed above with respect to the operations of system 200).

In some embodiments, system 400 may operate differently than the description above. For example, the current associated with capacitor 406 may be measured rather than the accumulated charge on capacitor 406. As another example, another capacitor may be coupled in series to capacitor 406 and the voltage across that capacitor may be measured instead of the accumulated charge on capacitor 406.

In some embodiments, the operation of system 400 described above may lead to certain advantages being realized. For example, negative effects associated with the magnitude of the capacitance of capacitor 454 (e.g. noise sensitivity) may be reduced or negated. Susceptibility to error due to the relative magnitudes of the capacitances of capacitor 454 and capacitor 450 may be reduced or negated. As another example, the area, power, and cost that may be used in implementing a circuit that detects whether object 412 is in a vicinity of a device may be reduced due to reducing charge removal procedures.

Figure 5:
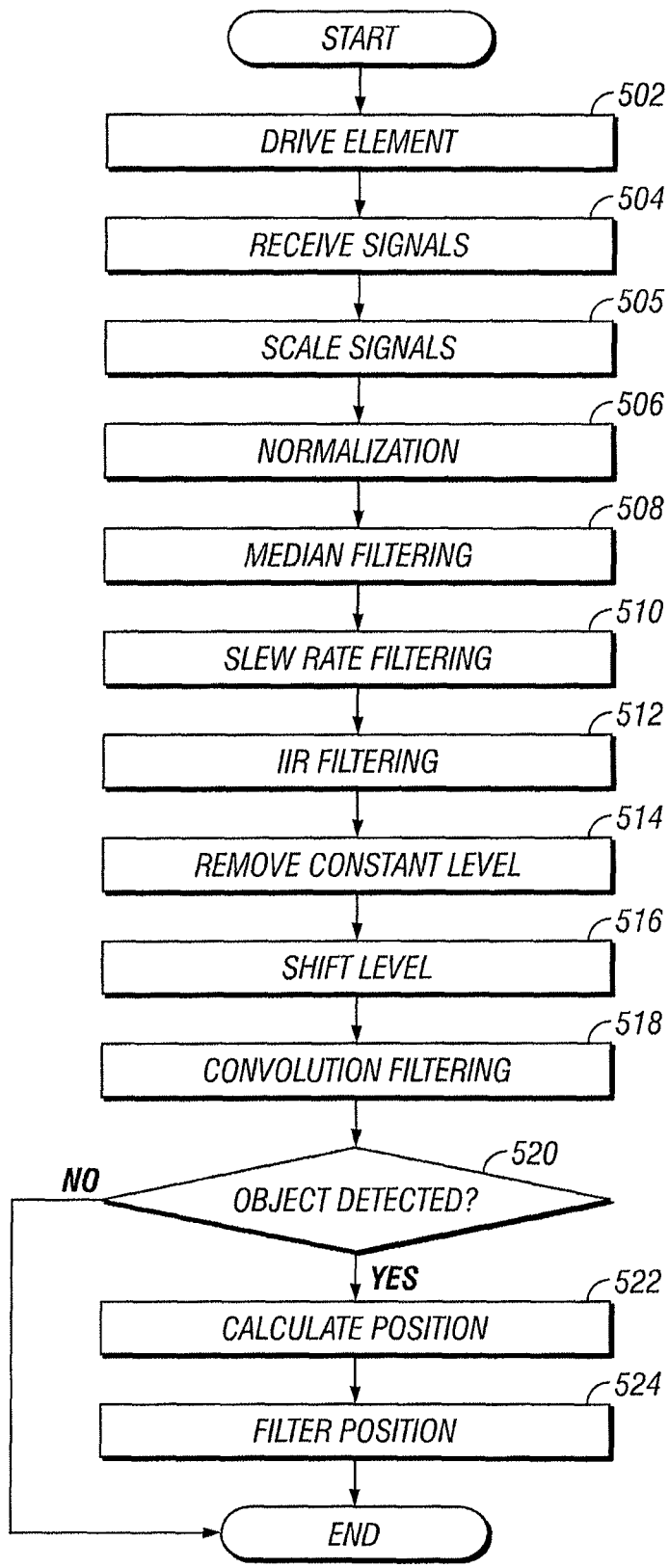
FIG. 5 illustrates an example of a method for detecting the presence of an object in a vicinity of a device.

FIG. 5 illustrates an example of a method for detecting the presence of an object in a vicinity of a device. The steps discussed below regarding FIG. 5 may be used in the systems described above with respect to FIGS. 1-4. The discussion of the steps of FIG. 5 below will reference components of FIG. 2 but other suitable components of this disclosure may perform the steps of FIG. 5. Some embodiments may repeat or omit certain steps of the method of FIG. 5 as well as add steps to the method of FIG. 5, where appropriate. Moreover, although this disclosure describes and illustrates particular steps of the method of FIG. 5 as occurring in a particular order, this disclosure contemplates any suitable steps of the method of FIG. 5 occurring in any suitable order including performing any suitable steps simultaneously. Furthermore, although this disclosure describes and illustrates particular components, devices, or systems carrying out particular steps of the methods of FIG. 5, this disclosure contemplates any suitable combination of any suitable components, devices, or systems carrying out any suitable steps of any of the methods of FIG. 5.

At step 502, in some embodiments, controller 226 sends a drive signal to drive element 230. At step 504, signals are received at controller 226 from touch sensor 222. This set of signals may represent charge accumulated on electrodes of touch sensor 222 as a result of, in part, capacitive coupling between object 212 and touch sensor 222. At step 505, the signals received at step 504 may be scaled down. This may be performed to address scaling up of signals that may occur when signals are received at step 504. The description of FIG. 4 above provides examples of how signals received at step 504 may be scaled up while measuring touch sensor 222. In some embodiments, step 505 may not be performed.

At step 506, in some embodiments, the values resulting from step 505 may be normalized by controller 226. This may be performed by subtracting the mean value of the values resulting from step 505 from each value of the set of values resulting from step 505. An advantage present in some embodiments of performing this step is that common mode noise may be suppressed.

At step 508, in some embodiments, median filtering may be performed by controller 226 on the set of values resulting from step 506. One example of how this may be performed is replacing a value associated with a particular electrode of touch sensor 222 with the median of a set of historical values associated with that electrode. The number of historical values is configurable. Other suitable techniques of median filtering may be employed. One advantage present in some embodiments of performing this step is suppression of signal value spikes due to noise.

At step 510, in some embodiments, slew rate filtering may be performed by controller 226 on the results of step 508. One example of how this may be performed is:

$$S_i = S_{iold} + \text{Min}(\text{SlewLimit}, \text{Max}(-\text{SlewLimit}, \text{Sraw}_i - S_{iold}))$$

SlewLimit is a configurable value related to the amount of change desired in the voltage signals being processed. $S_i$ is one of the voltage signals of the set of signals resulting from step 508 being replaced by the filtering. $S_{iold}$ is a signal taken from a measurement previous to step 502 corresponding to the signal being replaced at step 510. $\text{Sraw}_i$ is the voltage signal received at step 504 corresponding to $S_i$. An advantage present in some embodiments is that random noise (e.g. brief, random noise) may be suppressed.

At step 512, in some embodiments, infinite impulse response (IIR) filtering may be performed on the results of step 510. One example of how this may be performed is:

$$S_i = S_{iold} + \frac{1}{K}(\text{Sraw}_i - S_{iold})$$

$S_i$ is one of the voltage signals of the set of signals resulting from step 510 being replaced by the filtering of step 512. $S_{iold}$ is a signal taken from a measurement previous to step 502 corresponding to the signal being replaced at step 512. $\text{Sraw}_i$ is the voltage signal received at step 504 corresponding to the value being replaced. K is the IIR filtering strength. One advantage present in some embodiments of performing this step is suppression of short-length signal spikes and medium frequency noise. Low frequency signals may be passed through this filtering.

At step 514, in some embodiments, a constant level may be removed from the set of signals resulting from step 512. The level that is removed may be configurable. At step 516, a level shift may be performed. This may be performed by determining the shift needed to have the weakest values correspond to a zero level. In some embodiments, this may be performed by taking the median value of the two most negative signals as the value to correspond to the zero level. This may facilitate detection of whether object 212 is in a vicinity of device 210.

At step 518, in some embodiments, convolution filtering may be performed on the results of step 516. As an example, a one dimensional array may be used. Such an array may be {1, 1, 1}. One advantage present in some embodiments of performing this step is filtering of noise (e.g. single spike noise). Another advantage present in some embodiments of performing this step is smoothing the signal set by performing weighted or unweighted averages on values of the set of signals that are adjacent.

At step 520, in some embodiments, it is determined whether object 212 is in a vicinity of device 210. As an example, one or more thresholds may be applied to the set of signals to determine if object 212 is in a vicinity of device 210. Other suitable techniques may be performed. For example, these calculations may be used to determine capacitance 250. This determined value of capacitance 250 may be compared to a stored value of capacitance 252a. In this example, the stored value was measured at a time when it is known that object 212 is not in a vicinity of device 210. A suitable difference between the determined value of capacitance 250 and the stored value of capacitance 252a may lead to a determination by controller 226 that object 212 is in a vicinity of device 210. If it is determined that object 212 is in a vicinity of device 210, step 522 may be performed; if not, the method may end or restart.

At step 522, in some embodiments, a position on touch sensor 222 may be determined corresponding to the detected object 212. Object 212 may be in a vicinity of device 210 but may not be physically contacting device 210. The present disclosure contemplates using any suitable technique for determining a position on touch sensor 222 corresponding to the detected object 212. For example, larger values of the set of signals may be identified and electrodes corresponding to the identified larger values may be examined. Coordinates (e.g. x-y coordinates or x-y-z coordinates) may be determined by examining the position of the electrodes within touch sensor 222. In certain embodiments, coordinates may be determined by generating a delta array by subtracting a reference array from the array of data resulting from step 520.

The reference array may include a set of values determined by averaging generated by touch sensor 222 over a period of time. The reference array may represent an approximation of fixed offset values that are part of the set of values resulting from step 520. A threshold value is subtracted from the delta array to form a presence array. The threshold value may be determined by averaging various measurements and determining that values below the threshold value are considered noise and values above the threshold value are considered an event caused by the presence of object 212 in a vicinity of device 210. Negative values in the presence array may be set to zero. Detection algorithms are executed across the presence array to detect local maxima. The local maxima are reported as coordinates (e.g. x-y coordinates). In some embodiments, there may be multiple maximum values adjacent to one another; each of these may be reported as coordinates.

At step 524, in some embodiments, the position information calculated at step 522 may be filtered. As an example, adaptive IIR filtering may be used. One advantage present in some embodiments of performing this filtering is suppression of position uttering (e.g. calculating slightly different positions when object 212 is relatively still). After step 524 is performed, the method may end or restart.

In some embodiments, the techniques discussed above with respect to FIGS. 1-5 may provide one or more advantages. For example, these techniques may enable a system that has a touch interface to prepare for a touch event such that it may detect and respond faster to the touch event. This may include preparing sensors or controllers to detect the touch event by charging capacitors or otherwise preparing the system to detect touch events. As another example, the ability to detect an object in a vicinity of a touch interface enables the development and use of three-dimensional gestures. This may include having a system that uses a touch interface (e.g. a touch screen or a touch pad) to detect gestures that involve motion while an object is in contact with the touch interface and motion while the object is not in contact with the touch interface. Another example advantage is that driving the plate as discussed above may remove standing (e.g. common mode) charge thereby allowing for better detection of small signals even in the presence of large capacitances. Yet another example advantage is that detection of an object being in a vicinity of a device may be performed in the presence of noise in the touch detection portion of the device. Another example advantage is that a system that has a touch interface may deactivate the touch interface in response to determining that an object is in a vicinity of the system or is approaching the system without the need of an additional sensor (e.g. an infrared sensor) to detect the object.

Herein, reference to a computer-readable non-transitory storage medium encompasses, where appropriate, one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy disks, floppy disk drives (FDDs), magnetic tapes, holographic storage media, solid-state drives (SSDs), RAM-drives, SECURE DIGITAL cards, SECURE DIGITAL drives, other suitable computer-readable non-transitory storage media, or a suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, ranges of values, or steps, any of these embodiments may include any combination or permutation of any of the components, elements, functions, operations, ranges of values, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A system, comprising:
   a touch sensor, the touch sensor comprising a plurality of electrodes arranged adjacent to a surface, the touch sensor arranged in a first region, the first region consisting of a first area that includes the touch sensor and a second area between the touch sensor and a circuit board;
   a drive element situated external to the first area and the second area;
   a controller disposed on the circuit board and coupled to the touch sensor using a first set of conductors and to the drive element using a second set of conductors, the controller being configured to:
   send a drive signal to the drive element using the second set of conductors;
   after sending the drive signal to the drive element, receive a set of sense signals from the touch sensor; and
   using the set of sense signals, determine whether an object that is not in contact with the surface is in a vicinity of the surface.

2. The system of claim 1, wherein the controller is further configured to determine a distance between the object and the surface using the set of sense signals.

3. The system of claim 1, wherein the controller is further configured to detect a direction of movement of the object while the object is in the vicinity of the surface.

4. The system of claim 1, wherein:
   the surface is a touch screen;
   the drive element comprises metallic foil; and
   the second area spans along an entire edge of the touch sensor.

5. The system of claim 1, wherein the controller is further configured to determine a position associated with the object while the object is in the vicinity of the surface.

6. The system of claim 1, wherein:
   the plurality of electrodes are arranged along at least one axis; and the drive element situated external to the first region comprises a substantial portion of the drive element situated external to the first region and another portion of the drive element situated in the first region.

7. The system of claim 1, wherein:
the first region is adjacent to a first side of the circuit board;
the drive element is situated in a second region adjacent to a second side of the circuit board, the first side of the circuit board being different than the second side of the circuit board; and
the circuit board is situated between the touch sensor and the drive element.

8. A method, comprising:
sending, using a controller, a drive signal to a drive element using a second set of conductors, the controller disposed on a circuit board and coupled to a touch sensor using a first set of tracks and to the drive element using the second set of tracks;
after sending the drive signal to the drive element, receiving, at the controller, a set of sense signals from the touch sensor, the touch sensor comprising a plurality of electrodes arranged adjacent to a surface, the touch sensor arranged in a first region, the first region consisting of a first area that includes the touch sensor and a second area between the touch sensor and the circuit board, the drive element situated external to the first-region first area and the second area; and
determining, using the controller, whether an object that is not in contact with the surface is in a vicinity of the surface using the set of sense signals.

9. The method of claim 8, further comprising determining, using the controller, a distance between the object and the surface using the set of sense signals.

10. The method of claim 8, further comprising detecting, using the controller, a direction of movement of the object while the object is in the vicinity of the surface.

11. The method of claim 8, further comprising determining, using the controller, a position associated with the object while the object is in the vicinity of the surface.

12. The method of claim 8, wherein:
the plurality of electrodes are arranged along at least one axis;
the second area spans along an entire edge of the touch sensor; and
the drive element situated external to the first region comprises a substantial portion of the drive element situated external to the first region and another portion of the drive element situated in the first region.

13. The method of claim 8, wherein:
the first region is adjacent to a first side of the circuit board;
the drive element is situated in a second region adjacent to a second side of the circuit board, the first side of the circuit board being different than the second side of the circuit board; and
the circuit board is situated between the touch sensor and the drive element.

14. One or more computer-readable, non-transitory storage media embodying logic that is configured, when executed, to:
send, using a controller, a drive signal to a drive element using a second set of conductors, the controller disposed on a circuit board and coupled to a touch sensor using a first set of conductors and to the drive element using the second set of conductors;
after sending the drive signal to the drive element, receive a set of sense signals from the touch sensor, the touch sensor comprising a plurality of electrodes arranged adjacent to a surface, the touch sensor arranged in a first region, the first region consisting of a first area that includes the touch sensor and a second area between the touch sensor and the circuit board, the drive element situated external to the first area and the second area; and
determine, using the controller, whether an object that is not in contact with the surface is in a vicinity of the surface using the set of sense signals.

15. The media of claim 14, wherein the logic is further configured to determine a distance between the object and the surface using the set of sense signals.

16. The media of claim 14, wherein the logic is further configured to detect a direction of movement of the object while the object is in the vicinity of the surface.

17. The media of claim 14, wherein:
the surface is a touch screen;
the drive element comprises metallic foil; and
the second area spans along an entire edge of the touch sensor.

18. The media of claim 14, wherein the logic is further configured to determine a position associated with the object while the object is in the vicinity of the surface.

19. The media of claim 14, wherein:
the plurality of electrodes are arranged along at least one axis; and
the drive element situated external to the first region comprises a substantial portion of the drive element situated external to the first region and another portion of the drive element situated in the first region.

20. The media of claim 14, wherein:
the first region is adjacent to a first side of the circuit board;
the drive element is situated in a second region adjacent to a second side of the circuit board, the first side of the circuit board being different than the second side of the circuit board; and
the circuit board is situated between the touch sensor and the drive element.

\* \* \* \* \*